(12) United States Patent
VanDuyn et al.

(10) Patent No.: US 11,722,431 B2
(45) Date of Patent: Aug. 8, 2023

(54) GATEWAY PRIORITIZATION

(71) Applicant: DISH Network L.L.C., Englewood, CO (US)

(72) Inventors: Luke VanDuyn, Conifer, CO (US); Caroline Elizabeth Condon, Denver, CO (US); Levi Boscardin, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 17/515,413

(22) Filed: Oct. 30, 2021

(65) Prior Publication Data

US 2023/0136189 A1    May 4, 2023

(51) Int. Cl.
*H04L 47/80* (2022.01)
*H04L 12/46* (2006.01)

(52) U.S. Cl.
CPC .......... *H04L 47/805* (2013.01); *H04L 12/46* (2013.01)

(58) Field of Classification Search
CPC ............................ H04L 47/783; H04L 47/805
See application file for complete search history.

(56) References Cited

U.S. PATENT DOCUMENTS

| | | | | |
|---|---|---|---|---|
| 7,237,020 B1 * | 6/2007 | Drew | ...................... | H04L 47/10 370/217 |
| 2004/0052274 A1 * | 3/2004 | Wang | .................... | H04J 3/1694 370/468 |
| 2004/0062273 A1 * | 4/2004 | Frank | ...................... | H04L 69/40 370/468 |
| 2016/0204995 A1 * | 7/2016 | Sanda | ................... | H04W 28/18 709/223 |
| 2016/0212065 A1 * | 7/2016 | To | ......................... | H04L 47/525 |

OTHER PUBLICATIONS

"Archer AX1100 NetGen TriBand Gaming Router," TP-Link, downloaded from the Internet on Sep. 19, 2021 at https://www.tp-link.com/us/home-networking/wifi-router/archer-ax11000/.
"Change Your Router's Media Access Settings," Laptop Magazine, downloaded from the Internet on Oct. 5, 2021 at https://www.laptopmag.com/articles/media-access-control-priority-settings.
"The Best WiFi 6 Routers for 2021," PC Mag, downloaded from the Internet on Sep. 19, 2021 at https://www.pcmag.com/picks/the-best-wi-fi-6-routers.

* cited by examiner

*Primary Examiner* — Nicholas P Celani
(74) *Attorney, Agent, or Firm* — Wash Park IP Ltd.; John T. Kennedy (57) ABSTRACT

Systems, devices and methods are described for facilitating gateway prioritization. A system includes a gateway, a first node, and a second node coupled by an internal link. The gateway instantiates an allocator which allocates a link characteristic of the internal link based on a first resource request by the first node and in view of a second resource request by the second node. The requests identify a link characteristic for the internal link. The allocator allocates the link characteristic between the first node and the second node based on a ranking of the first node and the second node. The first link characteristic may be an internal link bandwidth. An ISP server is coupled by an external link to the gateway. The external link includes an external link characteristic which the first resource request identifies and the allocator allocates in view thereof.

13 Claims, 8 Drawing Sheets

GATEWAY PRIORITIZATION

TECHNICAL FIELD

The technology described herein generally relates to devices, systems, and processes for prioritizing use of communications links facilitated by gateways over local area networks and connections with Internet service providers.

BACKGROUND

Electronic devices are often coupled, by wire or wirelessly, to a Local Area Network (LAN). A router commonly forms the LAN and is connected, by wire or wirelessly and using an "internal link", to a modem. Non-limiting examples of modems include a Digital Subscriber Line (DSL) modem, a fiber optic modem, a cable modem, a cellular wireless access point, such as one providing 3G/4G/5G services, or otherwise. Often functions provided by a router and a modem may be combined into a gateway device. Herein, a router, a modem and a gateway are commonly referred to as a "gateway." The gateway is commonly further coupled, by wire or wirelessly, using an "external link" to an Internet Service Provider (ISP) switch, router, server or other telecommunications component (herein, commonly referred to as an "ISP server"). The ISP server is typically connected, via the Internet or other wide area network(s), to one or more third party servers, such as web servers, application servers, streaming content servers, databases, or otherwise (herein, commonly referred to as an "Internet site").

Typically, an internal link by a given electronic device with a gateway (on a LAN) and an external link between the gateway and an ISP server is defined in terms of "bandwidth" and "latency" and which result in an actual "throughput" for a given link. "Bandwidth" refers to the maximum capacity of a given link. Bandwidth is commonly expressed in bits per second, such as 100 Mbps (on hundred mega-bits per second), 1 Gbps (one giga-bits per second), and otherwise. "Latency" refers to an amount of delay in a transmission of data from a sender to a recipient. Latency is commonly expressed in time intervals, such as 5 msec (5 milli-seconds), or otherwise. "Throughput" refers to a quantity of data that is communicated (sent and/or received) over a given time period. Throughput depends on the bandwidth and the latency for a given link. Throughput is often considered when assessing capabilities of a given link as it represents, typically, an average quantity of data that is actually transmitted over a given link and within a given time period. Throughput is also typically expressed in bits-per-second.

On a given LAN, multiple electronic devices execute applications which communicate data across the LAN using one or more internal links. Such internal links commonly use a portion of a total bandwidth provided by a gateway. For example, a first link may be formed between a computer and a printer, while a second link may be formed between a gaming device and a wireless, internal network connected, display device.

Likewise, an external link between a given gateway and an ISP server may include multiple uses thereof, such uses may be identified as one or more data streams used by one or more electronic devices coupled to the gateway and/or by one or more applications being executed by such electronic device. Such data streams, combined, may use some or all of a given bandwidth of the external link between the gateway and the ISP server. Non-limiting examples of such uses may include on-line gaming, web/video conferencing, software as a service applications, streaming video, data uploading and downloading operations, and otherwise. Often many devices, and/or applications executed thereby, may request high data throughputs over a given internal link and/or over a given external link. Such simultaneous high data throughput requests, when utilized, may result in bandwidth and/or throughput limits for a given internal link, gateway, and/or external link being exceeded. Communication link latency may also increase.

When such conditions occur, bandwidth allocated (and/or latency permitted) to the one or more devices and/or applications then coupled to the gateway may be individually, collectively, randomly, or otherwise data limited resulting in a "throughput throttling," whereby a given application being unable to accomplish one or more operations specified by such application within a given time period. Such throughput throttling often decreases the performance of a given application to an unacceptable quality level. Where a quality level for a given application may be measured in one or more of metrics, non-limiting examples, including resolution, responsiveness, size, or otherwise. For some high-level gaming oriented gateways, a Quality of Service (QoS) boost option may be provided which configures the gateway for better supporting gaming applications. Such QoS boost may detrimentally impact throughput and the like for non-gaming applications.

Accordingly, devices, systems and methods for prioritizing throughput on internal links and external links is needed. Likewise, instances may occur where an existing bandwidth allocation and/or a guaranteed maximum latency for an external link is insufficient to support one or more applications or devices, and a throughput throttling for one or more applications is to be avoided. Under such conditions, a need may arise for more bandwidth and/or lesser latency for a given external link and for a given period, herein a need for such increased throughput is referred to as a "surge request" and fulfillment of a surge request is referred to as "surge processing". Mechanisms for facilitating surge requests are not readily available and, accordingly, devices, systems and methods for facilitating surge requesting are needed.

The various implementations and embodiments described herein provide devices, systems and processes which address the above and other concerns.

SUMMARY

The various implementations described herein provide devices, systems, and processes for gateway prioritization. The various implementations described herein also provide devices, systems and process for providing surge throughput for an external link and for use by one or more electronic devices and/or applications coupled to a given gateway coupled, using the external link, to an ISP server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for gateway prioritization. The system may include a gateway; a first node; and a second node. The gateway, first node, and second node may be communicatively coupled by an internal link. The gateway executes one or more non-transient computer instructions to instantiate an allocator.

The allocator allocates a link characteristic of the internal link based on a first resource request received from the first node and in view of a second resource request received from the second node. Other embodiments of this aspect include corresponding computer systems, apparatus, and computer programs recorded on one or more computer storage devices configured to perform the actions of the methods.

Implementations may include one or more of the following features. The first resource request may identify a first link characteristic for the internal link, the second resource request may identify the first link characteristic for the internal link, and the allocator may allocate the first link characteristic between the first node and the second node based on a ranking of the first node and the second node.

The first link characteristic may include an internal link bandwidth. The external link may include an external link characteristic. The first resource request may identify the external link characteristic, and the allocator allocates the external link characteristic in view of the first resource request.

The first resource request may include a request, by the first node, for a larger allocation of the internal link bandwidth to the first node. The allocator allocates the larger allocation of the internal link bandwidth to the first node by reducing an existing allocation of the internal link bandwidth to the second node. The first resource request may include a surge request requesting a modification in an external link characteristic. The allocator may confirm the first node is authorized to submit the surge request before performing the modification of the external link characteristic.

The external link characteristic may include an external link bandwidth, and a surge request may include a request for an increase of the external link bandwidth available for use by the first node. The surge request may include a request for a decrease in an external link bandwidth allocated to the second node.

A first node factor may be associated with the first node and a second node factor may be associated with the second node. The first node factor may identify, for example, an adult user of the first node.

A second node factor may identify a child user of the second node. The first node factor may be hierarchically ranked above the second node factor. The internal link may form a local area network (LAN) between the first node, the second node, and the gateway. The link characteristic may be a bandwidth of the internal link. A third node factor may be associated with the first node and may identify, for example, a device type. The third node factor may be second associated with the second node.

A first resource request may include a link characteristic for the internal link. A second resource request may include the link characteristic. The allocator allocates the link characteristic between the first node and the second node based on an ordering of the third node factor.

A fourth node factor may identify an application program type. The fourth node factor, for the first node, may identify a first application program associated with an employment activity, while the fourth node factor, for the second node, identifies a second application program associated with a remote schooling activity. The allocator may further prioritize link characteristics for the first application program over link characteristics for the second application program. The link characteristic may include a latency for data communicated over the LAN. Implementations of the described techniques may include hardware, a method or process, or computer software on a computer-accessible medium.

One general aspect of a method for gateway prioritization may include coupling a first node with a gateway; and communicating a first resource request to an allocator instantiated by the gateway, where the first resource request requests allocation of a networked resource to the first node. The method may include determining by the allocator if an existing networked resource is available to handle the first resource request. When the existing networked resource is available to handle the first resource request, the method may include fulfilling the first resource request by allocating the existing networked resource to the first node. When the existing networked resources is not available to handle the first resource request, the method may include determining whether a second instance of the networked resource is currently allocated to a second node. When the second instance of the networked resource is currently allocated to the second node, the method may include determining whether the first node has a higher prioritization ranking than the second node. When the first node has a higher prioritization ranking, the method may include fulfilling the first resource request by reallocating the second instance of the networked resource to the first node. Other embodiments of this aspect include corresponding computer systems, apparatus, and computer programs recorded on one or more computer storage devices configured to perform the actions of the methods.

Implementations of the method for gateway prioritization may include one or more of the following features. The networked resource may be at least one of an internal link and an external link. The internal link may couple a first node and a second node with a gateway. The external link may couple the gateway with an Internet Service Provider (ISP) server.

The first resource request may include a request for satisfying an internal link characteristic and an external link characteristic between the first node and the ISP server.

The internal link characteristic may include a minimum bandwidth. The external link characteristic may include a maximum latency.

When an existing networked resource is not available to handle a first resource request, the method may include receiving a surge request from the first node. The surge request may include a modification of the internal link characteristic and the external link characteristic.

The method may include second determining whether the first node is authorized for surge processing. When the first node is so authorized and for a modification of an internal link characteristic, the method may include identifying an internal link surge term acceptable to the first node and the gateway. The method may include identifying an external link surge term acceptable to the first node, the gateway, and the ISP server, and allocating one or more surged resources pursuant to the internal link surge term and the external link surge term. The internal link surge term may include an increase in a number of channels allocated on a local area network (LAN) coupling the first node and the second node with the gateway. The external link surge term may include an increased allocation of bandwidth to the first node for data communications arising over the external link. Implementations of the described techniques may include hardware, a method or process, or computer software on a computer-accessible medium.

BRIEF DESCRIPTION OF THE DRAWINGS

The features, aspects, advantages, functions, modules, and components of the devices, systems and processes provided by the various embodiments of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When the first reference label is used in the specification, the description is applicable to any of the similar components and/or views having the same first reference number irrespective of any additional alphabetic designators or second reference labels, if any.

DETAILED DESCRIPTION

Various implementations of the present disclosure describe devices, systems, and processes for gateway prioritization. As used herein, "gateway prioritization" refers to the allocation, amongst devices sending and/or receiving data (herein, a "node") of one or more link characteristics (as described below) of one or more networked resources. Gateway prioritization may be utilized to avoid throughput throttling and other communication connectivity concerns. As used herein, a "networked resource" is one or more of an internal link, a gateway, an external link, an ISP server, a processor provided by a node, an Internet site (as described below), and/or a combination of any of the foregoing. The various implementations described herein also provide devices, systems and process for facilitating surge requests (as described below).

Various implementation of the present disclosure facilitate gateway prioritization based upon a resource request, link characteristics and node factors (as further described below). Various implementation also facilitate on-demand gateway prioritization.

As used herein, an internal link, an external link and/or a combined internal and external link are commonly referred to as a "networked link". In accordance with least one implementation, gateway prioritization may be provided with respect to one or more networked resources. Gateway prioritization may be provided in view of one or more resource requests. As used herein, a "resource request" is a request by a node for one or more of networked resources to satisfy at least one link characteristics.

Herein, a "link characteristic" is a quantifiable characteristic of a network resource, such as a bandwidth, latency, resilience, robustness, security, quality of service, (QoS), throughput, number of sub-channels, channel width, encryption protocol, number of processor cores, number of processing threads, data processing speed, and the like. A resource request may be specified automatically. For example, an application program may include one or more communication link characteristics for a given, networked link, such as a minimum bandwidth, maximum latency, or otherwise. A resource request may be specified semi-automatically. For example, at a node, a user preference or a user selection may be provided wherein one or more link characteristic options from a range of acceptable or available link characteristics may be selected or otherwise. A resource request may be specified manually by a node uniquely selecting one or more link characteristics.

A user of a node may individually specify one or more communication link characteristics to use for a given networked link. A first resource request may be specified for an internal link while a second resource request may be specified for an external link. The first resource request may differ from the second resource request in terms of one or more link characteristics or otherwise. For example, a resource request may specify that a first node (which may be associated with a first user) receives at least a minimum amount of bandwidth for an external link supported by an internal link during certain time periods, such as during working hours (e.g., 8am to 5pm, Monday thru Friday).

A second resource request may specify that a first node (e.g., associated with a first user) receives data over multiple channels so as to facilitate rapid downloads of large data files over multiple 1 Gbps or greater networked links. A third resource request may specify that a maximum latency, for a given data rate, does not exceed a specified threshold between an ISP server and a given node. Such a need might arise, for example, when a node is remotely controlling another device (such as a drone), another process (such as a factory assembly line), or otherwise where the communication of data between two or more nodes and/or servers or otherwise is time critical and minimal in-transit delays are requested.

A resource request may be specified in terms of one or more "node factors" and one or more link characteristics. Node factors identify a characteristic of a node, such as a user (a person), a device type, an application, a time of day, a location, or otherwise. A node factor may provide a correspondence between a node and one or more link characteristics. A node factor for multiple nodes may be ranked, prioritized, stand alone, or otherwise specified. For example, a node factor may identify a sending and/or receiving destination for a given set of data, at a given node, as being associated with an adult person, a child person, an artificial entity, or otherwise. Ranking and/or prioritization of networked resources may be provided based upon one or more node factors associated with a node and link characteristics identified in a resource request.

By another example, a node factor may identify a sending or receiving destination (of a given set of data) based on a device type, such as a laptop, gaming console, industrial process, drone, remote controlled object, automobile, or otherwise. The device type may identify link characteristics supported by the given device. For example, a device not including a Wi-Fi 6E compatible interface would not include a Wi-Fi 6 node factor or otherwise include link characteristics for 6 GHz signaling or the like.

A node may be associated with multiple node factors. For example, a personal computer (PC) (a node) may support use of given set of link characteristics, while also supporting use of the PC by different users, application programs, and otherwise at various times. One or more node factors and supported link characteristics of a node may be associated with a higher prioritization or ranking based upon a then existing user (e.g., a parent or a child), a then arising application program (e.g., a word processing application versus a movie download), a scheduled activity (e.g., a planned departure within a given time frame, thereby necessitating a transfer of a given set of data at a higher or lower throughput), or otherwise.

A node factor ranking system may be used to rank resource requests. For example, a web conference (a resource request type) may have a higher node factor ranking than an on-line game. Similarly, an adult user's resource request may have a higher node factor ranking than a child's resource request. Multiple hierarchies and/or ranking schemes may be used for organizing node factors and prioritizing multiple resource request and the allocation of networked resources. A node factor ranking system may consider link characteristics identified, if any, in two or more resource requests.

For example, an adult's user's resource request to web surf may have a lower ranking for a latency link characteristic than a child user's latency link characteristic resource request occurring during an online learning session, such as an online test for a student. Accordingly, for at least one implementation, a multi-variable ranking, comparison and analysis of resource requests, link characteristics and node factors associated therewith, may be considered in allocating, prioritizing, scheduling, and otherwise organizing uses of one or more networked resources with respect to two or more nodes. Multi-variable ranking, comparison, optimizations, analysis, and the like may involve the use of artificial intelligence and/or machine learning systems and components.

Figure 1:
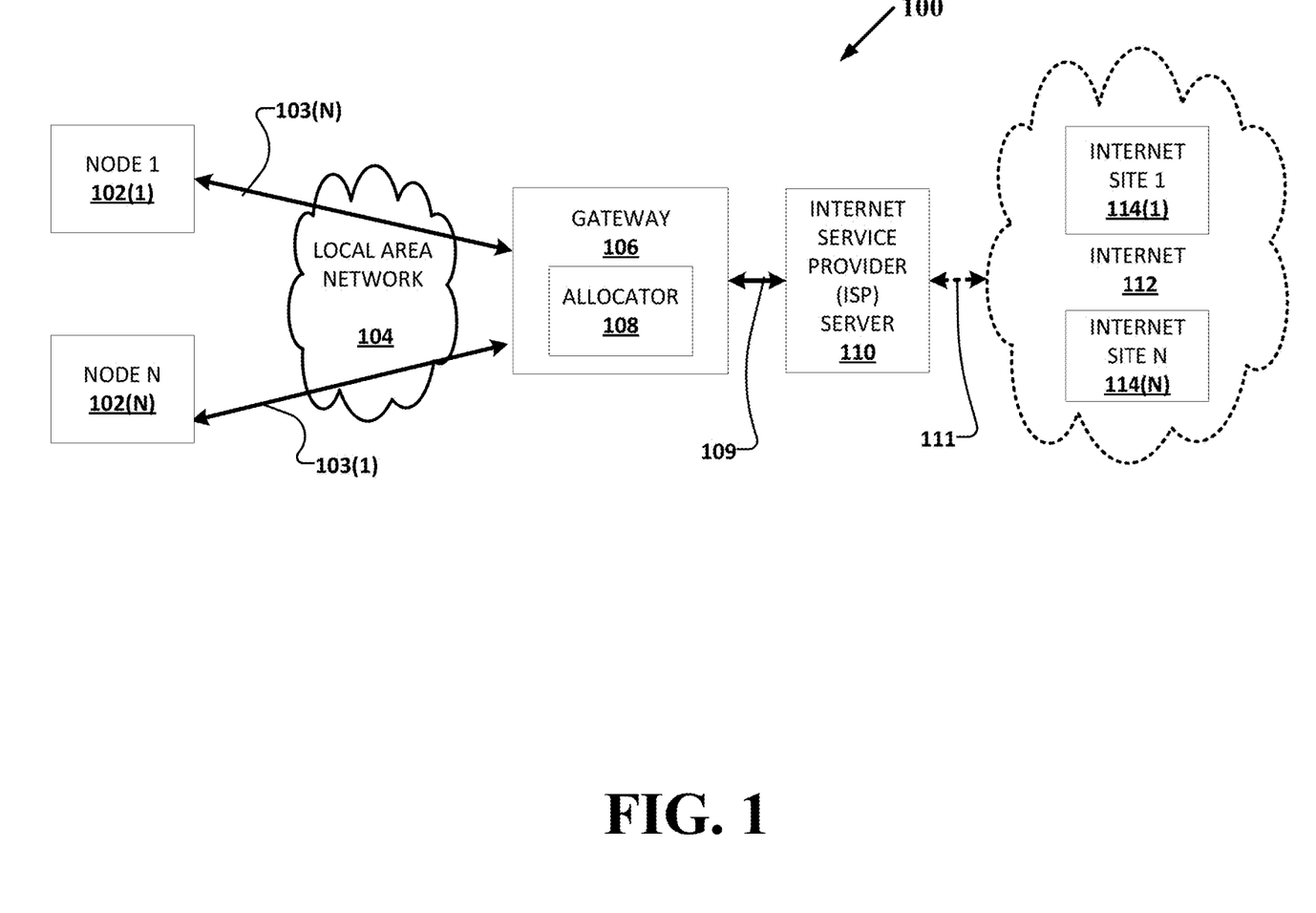
FIG. 1 is a schematic representation of a first system used to facilitate gateway prioritization and in accordance with at least one implementation of the present disclosure.

In FIG. 1, an implementation of the present disclosure of a first system 100 for providing gateway prioritization is shown. The first system 100 may include one or more nodes 102(1)/(N). As used herein, a "node" refers to a physical component that executes one or more computer instructions and is configured to communicate data by and between another node, a gateway 106, an ISP server 110, and/or elsewhere (such as to an Internet based web server). A node 102 may be associated with a "user" such as a human being, an artificial intelligence, a device, an application, or otherwise. A node 102 may be any device, application, sever, or system configured to receive, process, send and otherwise attend to data, execute computer instructions (as further defined below), execute commands and/or otherwise communicate data by and between one or more other nodes 102 or otherwise. A node 102 may be configured to perform any given data processing, presenting, communicating, storage, or other functions. Non-limiting examples of various hardware and/or software components used for at least one implementation of a node 102 are described below, where fewer, more and other components may be used for a given node 102 implementation.

As further shown in FIG. 1, a node may be communicatively coupled to a gateway 106 by one or more, wired and/or wireless, internal links 103(1)/(N). For at least one implementation, the gateway 106 may form a LAN 104 via which data may be communicated amongst the nodes 102(1)/(N) using the internal links 103. For other implementations, nodes 102 may not be discoverable on the LAN and/or otherwise permitted to communicate data amongst other networked resources using the LAN. The gateway 106 may instantiate an allocator 108 configured to facilitate gateway prioritization of one or more networked resources. The allocator 108 is further described below.

The gateway 106 may be communicatively coupled to an ISP server 110 via an external link 109. The ISP server 110 may be communicatively coupled to the Internet 112, and one or more Internet sites 114, via one or more Internet links 111. As used herein, the term "Internet site" includes any application servers, databases, web servers, the Cloud, or the like accessible by an ISP server via the Internet, a wide area public network, a private network, or otherwise. As used herein, a reference to the "Cloud" includes references to cloud computing, cloud storage, cloud communications, and/or other technology resources. A use of a Cloud resource may be private (limited to certain users and/or uses), public (available for many users and/or uses), hybrid, dedicated, non-dedicated, or otherwise.

Figure 2:
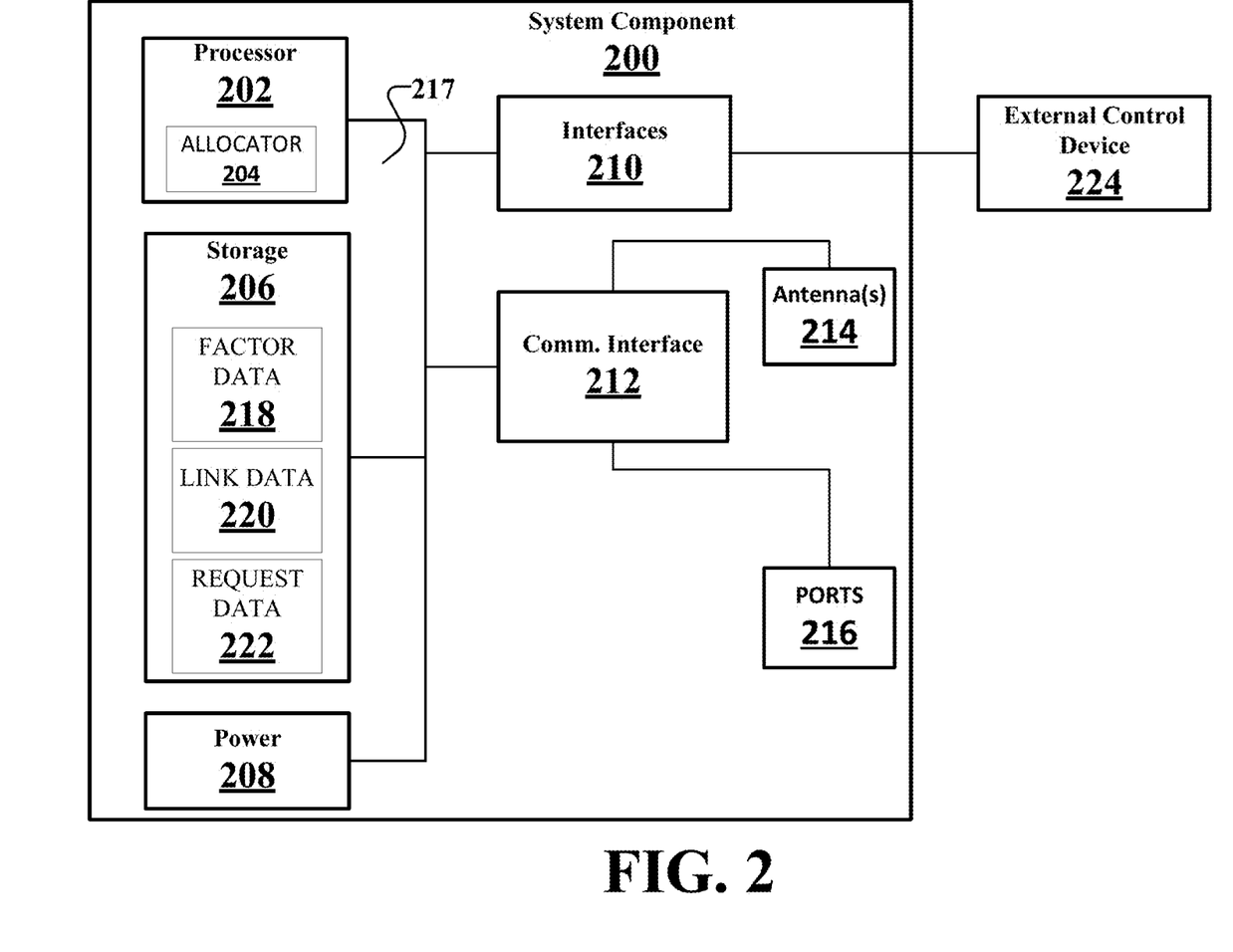
FIG. 2 is a schematic representation of a system component used to facilitate gateway prioritization and in accordance with at least one implementation of the present disclosure.
Figure 3:
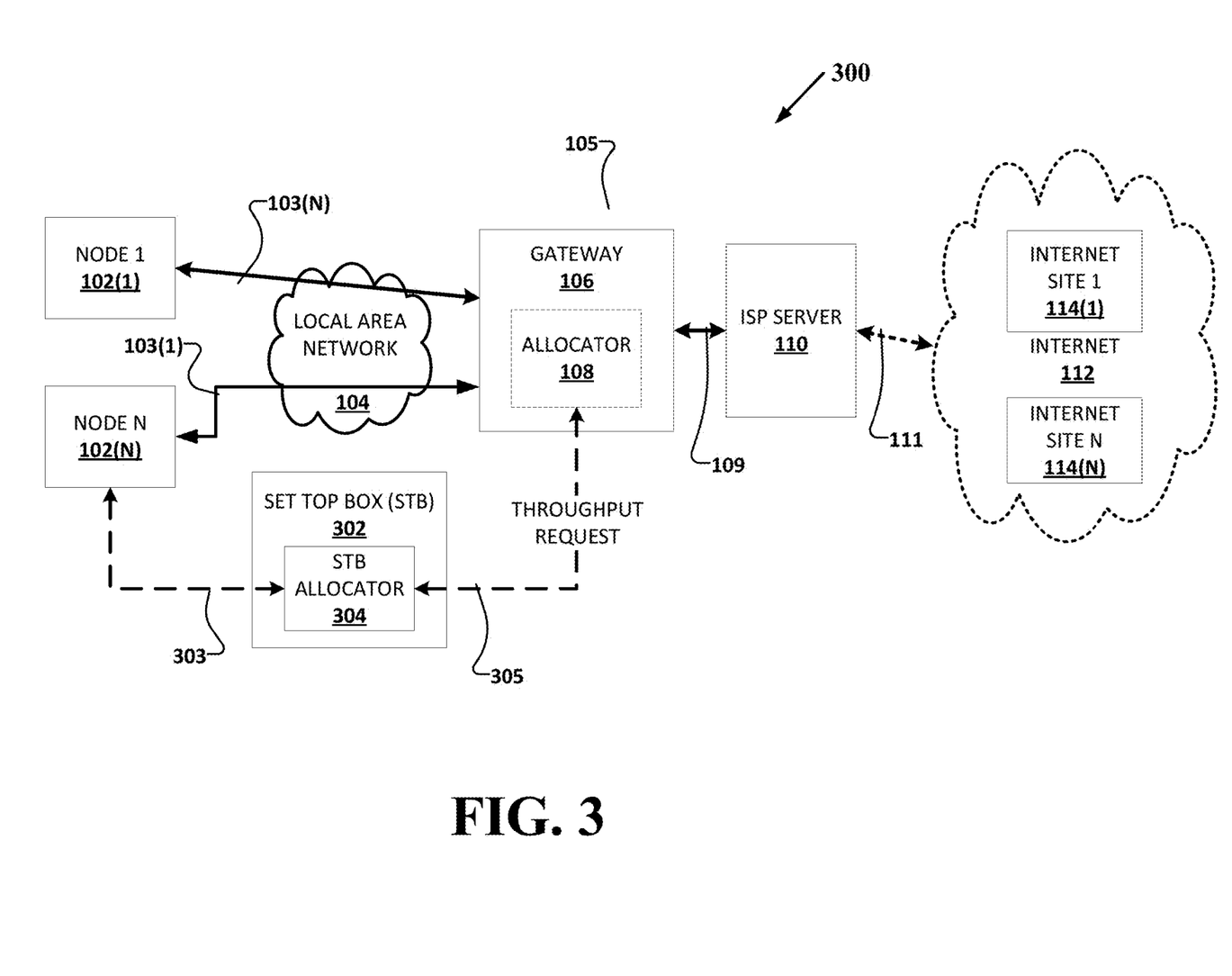
FIG. 3 is a schematic representation of a second system used to facilitate gateway prioritization and in accordance with at least one implementation of the present disclosure.

In FIG. 2, a schematic representation of a system component 200 is shown. As used herein "system component" refers to a node 102, a gateway 106, and/or a set top box (STB) 302 (as shown in FIG. 3 and described below). A system component 200 may be configured to include, in hardware and/or hardware and software, a processor 202 (herein a "processor") configured to instantiate an allocator 204. The system component 200 may include a storage 206, a power interface 208, and one or more interfaces 210 such as a user interface, a periphery interface, or the like. A communications interface 212 coupled to one or more antennas 314 and one or more ports 216 is included as a system component 200. It is to be appreciated that an implementation of a system component 200 may include any combination of the foregoing and additional components, while remaining consistent with an implementation of the present disclosure.

For at least one implementation, a system component may include an external control device 224, such as a button on a system component 200, a pluggable USB dongle or the like, that provides computer instructions (as further described below) and/or user interface elements which facilitate gateway prioritization and/or surge request operations. For at least one implementation, the external control device 224 may be provided in conjunction with one or more of a node 102, a gateway 106, and an STB 302.

The external control device 224 may present one or more user interfaces by which an authorized user may prioritize their node's communications needs over one or more second node's and/or user's communications needs. For example, a user may determine that a given application program executing on a first node, such as an application program supporting a web conference, is lagging, slowly updating, or otherwise not providing a given experience. For at least one implementation, a virtual button, such as an icon on a computer screen, a keyboard hotkey, a voice prompt, or otherwise may be used to instruct the first node to request prioritization of link characteristics. Upon such request being submitted, an allocator 108 (executing on one or more nodes and/or gateway devices) may determine to reallocate, provide, obtain, or otherwise manage (herein, "allocate")

one or more link characteristics such that the first node performance improves. Such allocation may occur for a given time period, such as during a scheduled time for the web conference, for an on-demand basis, on a surge basis, on a good until cancelled basis, or otherwise.

For at least one implementation, allocation may occur automatically, such as without requiring a user's request. For example, a web conference application may be automatically prioritized for a first allocation of one or more link characteristics over a gaming application. For an implementation, allocation may occur based upon traffic patterns then existing, previously existing, predicted to occur, preset configurations, or otherwise. For an implementation, allocation may occur based upon identities of users of nodes commonly communicatively coupled to one or more given gateways, ISP servers, Internet sites, or otherwise. For example, user nodes coupled to a SLINGTV (TM) video streaming server might be automatically prioritized with respect to one more allocations of link characteristics over user nodes coupled to another entities video streaming server.

For at least one implementation, the processor 202 may be any one or more processing devices including, but not limited to, a general purpose processor, a special purpose processor, a digital signal processor (DSP), a controller (micro or otherwise), an application specific integrated circuit (ASIC), or any other type of integrated circuit or combinations thereof. The processor 202 may include one or more hardware processors, such as 32-bit and 64-bit central processing units, multi-core ARM based processors, microprocessors, microcontrollers, and otherwise. The data processing operations executed by the processor 202 may include one or more non-transient computer executable instructions. The non-transient computer executable instructions may include instructions for executing one or more applications, engines, and/or processes configured to perform computer executable operations (herein, "computer instructions"). The hardware and software technologies provided by the processor 202 and the computer instructions may arise in any computing configuration including, but not limited to, local, remote, distributed, blade, virtual, or other configurations and/or systems configured for use in support of the one or more embodiments of the present disclosure. The computer instructions may be suitable stored or otherwise provided to the processor 202 for execution thereby for any given implementation. Such computer instructions may be executed by the processor 202 in support of any function of a system component 200.

The computer instructions may be stored and/or provided by a storage 206, provided with the processor 202 itself, such as in cache or read only memory (ROM), as firmware, accessible from a remote source, accessible from an external control device 224, or otherwise. The processor 202 may be separated into one or more logical processing elements that execute computer instructions to facilitate the various features and functions of a system component 200, as so configured in accordance with one or more embodiments of the present disclosure. Non-limiting examples of such features and functions supported by the processor 202 may include data processing, communications circuit control, security, device maintenance and monitoring, and any other function or feature provided, supported and/or executed by a system component 200.

It is to be appreciated that one or more system components 200 may be legacy devices and/or systems that have been configured to execute the computer instructions via one or more downloads, device/system updates, installs, add-on hardware or software modules or otherwise. It is also to be appreciated that a system component 200 may also and/or alternatively be new devices specifically configured to facilitate gateway prioritization and/or surge throughput functionalities. Thus, it is to be appreciated that a given implementation of the present disclosure may be accomplished using known or existing devices and systems that have been configured to execute computer instructions supporting gateway prioritization and/or surge throughput functionalities.

A storage 206 may be used and configured to store one or more data sets, such data sets may include one or more computer instructions. Such data sets may be generated based upon actual use of a system component 200 or other data provided to or generated by any other component of a system. Such data sets may be provided during an initial set-up and/or initial use of a system component 200, may be generated during registration, activation, use or other operations regarding a system component 200. The storage 206 may have any form known in the art or later arising removable or non-removable storage component. Non-limiting examples of storage components that may be used herewith include random-access memory, ROM, flash memory, memory sticks, secure digital memory cards, compact flash memory cards, subscriber identity module (SIM) cards, electronic SIM cards (also referred to as eSim cards), USB dongles, and others. One or more storage 206 may be provided with, local to, or remote from a system component 200.

As further shown in FIG. 2, a system component 200 may include a power 306 may include use of any known or later arising power technologies. Non-limiting examples of such power technologies include batteries, solar arrays, power converters, line power sources, fuel cells, and the like.

As further shown in FIG. 2, a system component 200 may include one or more interfaces 210. The interfaces 210 may be configured to be communicatively coupled with one or more user interfaces (input/output devices), such as keyboards, mouse, touch screens, voice command components, gesture command components, and the like and/or other peripheral elements (if any), such as an external control device 224. A peripheral element may be integrated with and/or provided separately with respect to a system component 200.

As further shown in FIG. 2, a system component 200 may include a communications interface 212. The communications interface 212 may be further configured to include one or more transponders, data processors, signal processors, or the like. Communications interface 212 may be configured to support communications using limited range communications technologies, such as Wi-Fi, BLUETOOTH, and others and long range communications technologies, such as cellular technologies, Ethernet, and otherwise. The communications interface 212 may be communicatively coupled to one or more internal and/or external antenna(s) 214 and/or data ports ("ports") 216. The antenna(s) 214 may be static, beam forming, dynamic, or otherwise configured. For at least one implementation, the antenna(s) 214, transponder(s) and/or other known and commonly arising elements of a communications interface 212 may be configured to support various frequency ranges, protocols, modulation schemes, encryption technologies, data security protocols and/or the like. The port(s) 216 may include Ethernet ports, Universal Serial Bus (USB) ports, FIREWIRE ports, or the like. Any known or later arising antennas and/or ports may be used in an implementation.

One or more of the above elements of a system component 200 may be communicatively coupled to one or more other elements by use of a data bus 217 or the like. Any know or later arising data bus 217 technologies may be used including those that use electrical, optical, radio frequency, or other technologies.

As discussed above, the processor 202 may be configured to provide an allocator 204 by executing one or more computer instructions. The allocator 204 may be virtualized, instantiated, implemented or otherwise provided by the processor in one or more forms, such as an application program, a widget, an operating system service, a computer engine, an application program interface, or otherwise. The allocator 204 may be configured to implement gateway prioritization and/or surge throughput functionalities based upon one or more of factor data 218, link data 220, and request data 222. For at least one implementation the factor data 218, link data 220 and/or request data 222 may be stored by storage 206, provided real-time, provided on-demand, obtained from a third party server or service, or otherwise. The allocator 204 may be configured to determine which of one or more link characteristics to allocate to one or more node factors in view of one or more resource request.

For example, link data 220 may include data indicating that a link characteristics for a given networked link provides a given maximum bandwidth and at a given latency. Further, a first set of factor data 218 may identify a given node is associated with a given user (such as an adult person), a device (such as a laptop computer), and a given application program (such as a web conferencing application). Based on one or more of these node factors, a first link characteristic (such as a minimum bandwidth) may be identified. Further, a priority of such link characteristic may be specified, such as a resource request of high importance, low importance, or otherwise. A second set of factor data 218, for a second node, may be associated with a second user (such as a child) and a second set of request data 222 may specify a second link characteristic. Based upon such data sets, the allocator 204 may determine how and when to allocate networked resources and link characteristics provided thereby, to the first node and to the second node.

Factor data 218 may be provided to, and/or accessible by, the allocator 204 on a predetermined, such as calendared basis, or on a real-time basis, such as when a node 102 joins the LAN 104 and/or terminates participation on the LAN 104, or otherwise. As discussed above, factor data 218 may vary by time, user, device, application, location of use, and otherwise.

Link data 220 may be provided to, and/or accessible by, the allocator 204 on any basis, such as predetermined, ad hoc, or otherwise. Link data 220 may vary based upon nodes present in a given system, at a given time, system resources available, external influencers present, such as electromagnetic interference (in the case of wireless links), and otherwise. Link data 220 (which identifies one or more link characteristics) may vary over any given time interval. The allocator 204 may be configured to repetitiously determine allocations of networked resources to various nodes in view of then arising and often varying resource request, node factors, and link characteristics.

For at least one implementation, request data 222 may be provided to the processor on a real-time or substantially real-time basis. For example, the interfaces 210 may be configured to receive inputs from a user of a node that indicate an immediate or time dependent need for one or more resource request. For example, an urgent, non-scheduled web conference versus a calendared non-critical web-conference. For an implementation, request data 222 may be provided to the allocator 204 based upon scheduled activities, such as those identified on a calendaring application, real-time, or otherwise.

In FIG. 3, an implementation of a second system 300 for providing gateway prioritization and/or surge throughput functionalities is shown. The second system 300 includes two or more nodes 102(1)/(N), coupled by internal links 103(1)/(N), to the gateway 106, by external link 109 to an ISP server 110, that is further coupled by an Internet link 111 to the Internet 112. The second system 300 further may include a set top box (STB) 302 configured to implement an STB allocator 304. The STB allocator 304 may include one or more of the features and functions of the allocator 108 of the first system 100. One or more of such features and functions may also be provided by the STB 302. One or more of such features and functions may be provided, in whole or in part, by the gateway 106, which may function as an optional allocator 108, for example, when the STB 302 is unpowered, or otherwise. The STB 302 may be coupled to a node, such as node 1 102(1) via a first STB link 303 and to the gateway 106 (and the LAN 104) via a second STB link 305. The STB 302 may be any electronic device configured to receive, send, process, or otherwise manipulate audio video, graphic, video, and other forms of data. Non-limiting examples of STBs include gaming consoles, such as X-BOX (TM) and PLAYSTATION, cable boxes, direct broadcast television boxes such as those provided by DIRECTV and DISH NETWORK, 10-foot devices, such as ROKU streaming sticks, AMAZON FIRE TV STICKS, APPLE TV, and others.

For at least one implementation, the allocator 108 and the STB allocator 304 may be utilized. For such an implementation, one of the allocator 108 or the STB allocator 304 may be configured as a controlling allocator which provides final control over allocations of link characteristics of one or more networked resources when conflicting resource request or the like are received by the allocator 108 and the STB allocator 304.

Figure 4:
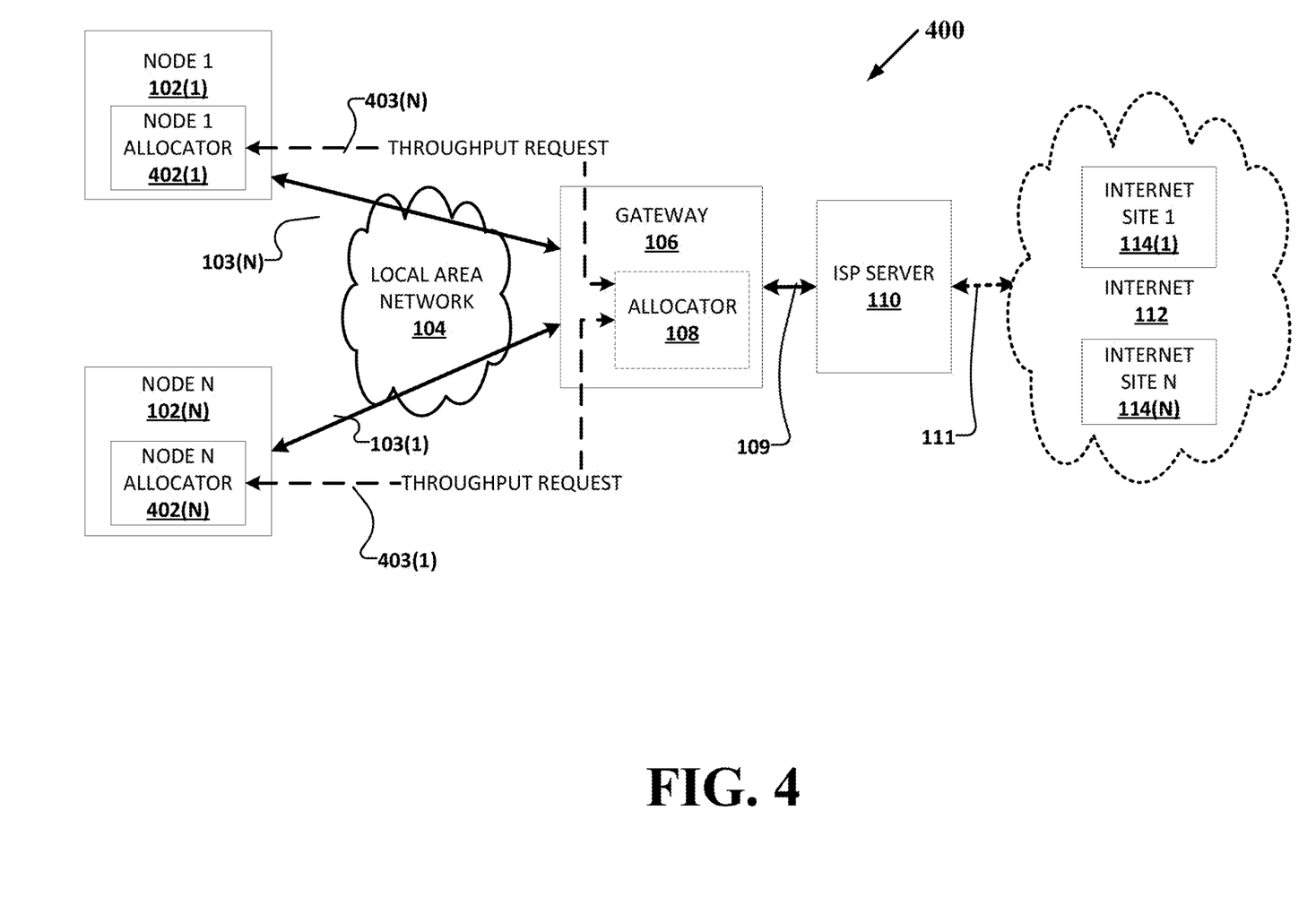
FIG. 4 is a schematic representation of a third system used to facilitate gateway prioritization and in accordance with at least one implementation of the present disclosure.

In FIG. 4, an implementation of a third system 400 for providing gateway prioritization and/or surge throughput functionalities is shown. The third system 400 includes two or more nodes 102(1)/(N), coupled by internal links 103(1)/(N), to the gateway 106, by external link 109 to an ISP server 110, that is further coupled by an Internet link 111 to the Internet 112. The third system 400 may also include node allocators 402, such as a first node allocator 402(1) and an Nth node allocator 402(N). The node allocator(s) 402 may include one or more of the features and functions of the allocator 108 of the first system 100. One or more of such features and functions may be provided by the gateway 106, which may function as an optional allocator 108, for example, when a give node allocator 402 is unpowered, or otherwise. The node allocators 402 may be configured to resolve, amongst multiple nodes, prioritizations of network resources and allocations of link characteristics.

For example, a first node allocator 402(1) may be configured to operate as a controlling node allocator which instructs, via the LAN 104, an Nth node allocator 402(N), to modify the Nth node's utilization of one or more networked resources, as embodied, for example, in one or more link characteristics. For example, the first node 102(1) may instruct the Nth node 102(N), using their respective node allocators 402(1)/(N), to utilize a different radio frequency (such as 2.4 GHz versus 5 GHz), a different bandwidth (such as 10 Mbps versus 100 Mbps), on the LAN, on the external link 109, or otherwise.

Figure 5:
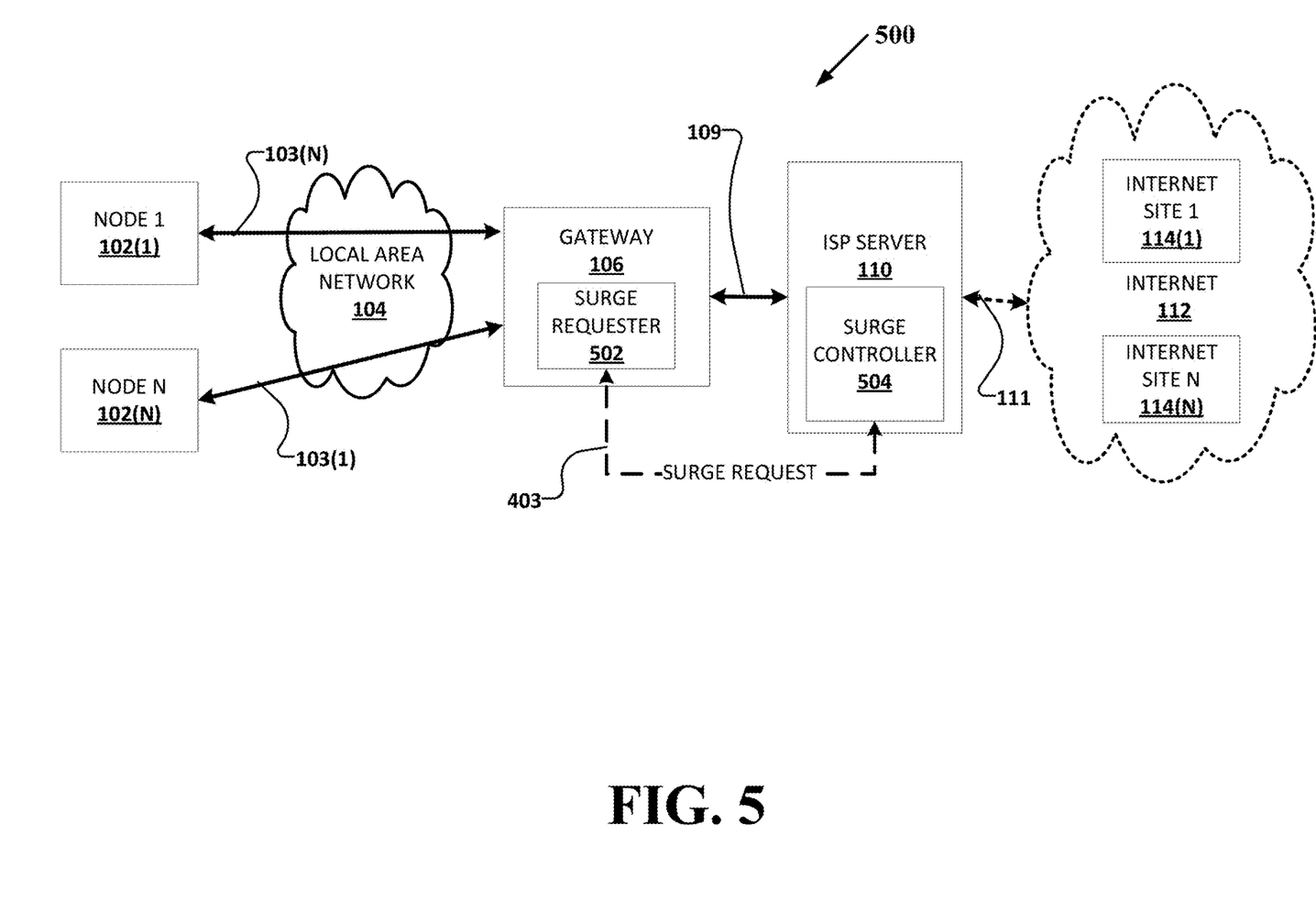
FIG. 5 is a schematic representation of a fourth system used to facilitate gateway prioritization and in accordance with at least one implementation of the present disclosure.

In FIG. 5, an implementation of a fourth system 500 for providing gateway prioritization and/or surge throughput functionalities is shown. The fourth system 500 includes two or more nodes 102(1)/(N), coupled by internal links 103(1)/(N), to the gateway 106, by external link 109 to an ISP server 110, that is further coupled by an Internet link 111 to the Internet 112. The fourth system 500 may include a surge requestor 502. The surge requestor 502 may be provided, for example and not by limitation, by the gateway 106, or any other any system component, including at a node 102 and/or an STB 302. The surge requestor 502 may instantiated from computer instructions executed by a processor 202 in a system component 200. The surge requestor 502 may be provided and/or instantiated in conjunction with and/or separate from an allocator 204, an STB allocator 304, and/or a node allocator 402. The surge requestor 502 may be configured to communicate a surge request, using, for example, the external link 109, to the ISP server 110. The surge request may include any request for a modification in one or more link characteristics. Such request may include a modification of one or more link characteristics for one or more sessions, channels, or otherwise, that exist or will in the future exist, between a given one or more nodes 102, the ISP server 110 and the Internet 112 or otherwise.

The ISP server 110 may be configured to include a surge controller 504 which may include computer instructions, which when executed by a processor, instantiate functions which facilitate the receiving, responding to (as appropriate, permissible, or otherwise), accounting, and other operations of surge requests.

For example, a first node 102(1) may typically utilize, on a daily or other basis, an aggregate bandwidth X with the ISP server 110. To timely download a large file, a user of the first node 102(1) may desire to request, from the ISP server 110, a larger bandwidth on a temporary or other basis. For example, a bandwidth which is 4X. The ISP server 110 may determine that the external link 109 and other ISP server 110 and/or other system components may be able to support a bandwidth of 2X. Further, the ISP server 110 may determine that an additional fee will be incurred for use of the 2X bandwidth. Such pricing and additional bandwidth allocation may occur for a given period, until a given operation completes, until the increase in the bandwidth request is terminated, or otherwise.

The system may be configured to provide notifications to a given user of network resource allocations, surge throughput requests realized, and otherwise. Such notifications may inform a user of data limits or other limits, charges for setting, adjusting, exceeding such limits, credits for limits of unutilized network resources, and otherwise.

Figure 6:
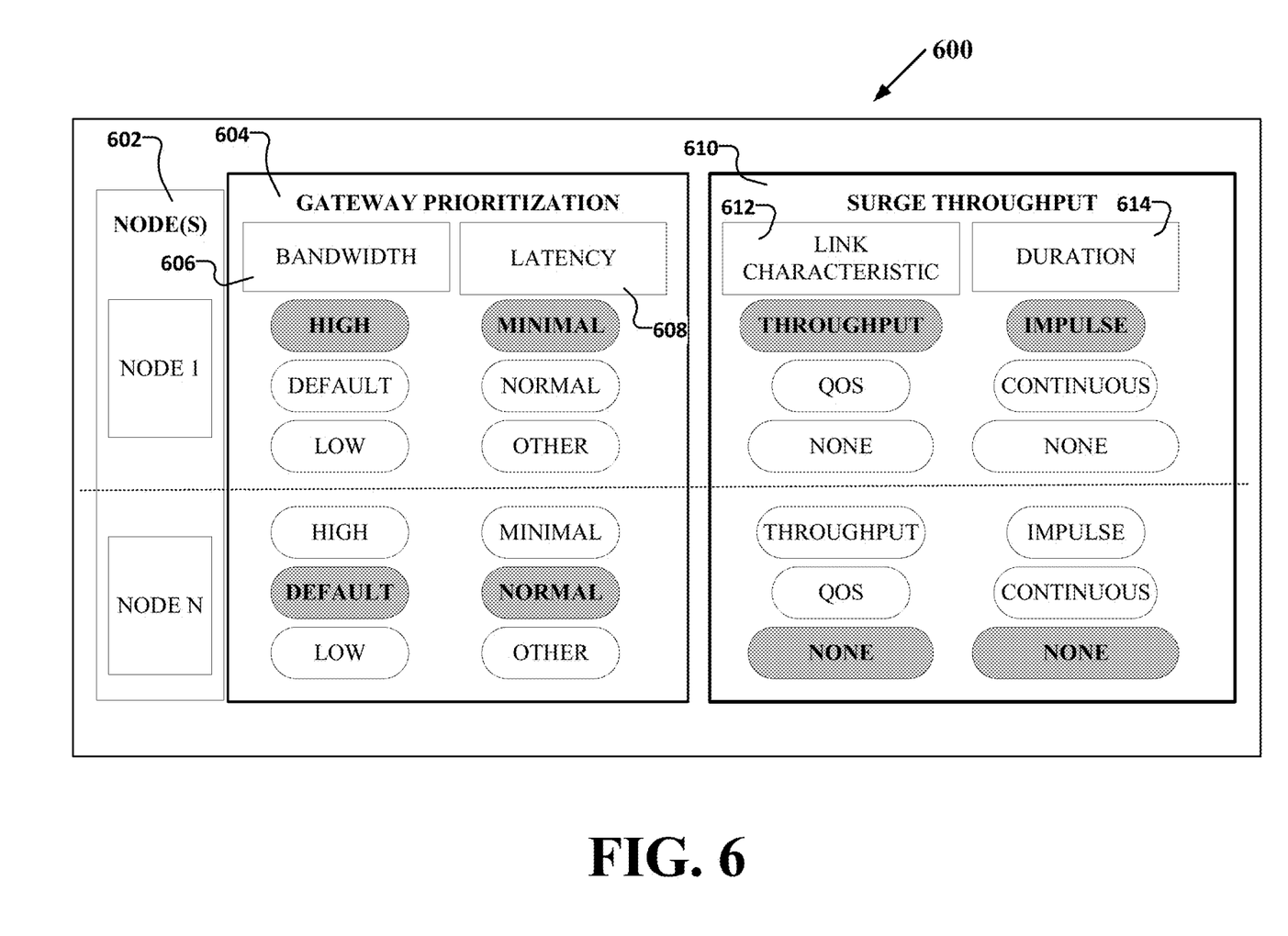
FIG. 6 is an illustration of a user interface providing options for gateway prioritization and surge throughput requesting and in accordance with at least one implementation of the present disclosure.

As shown in FIG. 6, an allocator 108, an STB allocator 304, and/or a node allocator 402 may be configured to include a surge requestor 502 which presents a user interface 600 by which a user, of a node 102, may specify one or more resource requests including, but not limited to, a need for gateway prioritization and/or surge throughput functions. Various arrangements of user interface elements may be utilized and FIG. 6 is representative of one implementation.

The user interface 600 may include a node section 602 identifying one or more nodes 102. The nodes 102 may be individually, collectively, or by groupings thereof selectable.

The user interface 600 may include a gateway prioritization section 604 that identifies options for gateway prioritization modifications. Such options may correspond to one or more link characteristics. In FIG. 6, non-limiting examples of gateway prioritization options shown include a "BANDWIDTH" section 606 and a "LATENCY" section 608. The gateway prioritization options may be further defined by various settings, such as the non-limiting examples of "High", "Default" and "Low" for bandwidth settings and "Minimal", "Default" and "Other" for latency settings. It is to be appreciated that any setting levels, or otherwise, may be utilized. For at least one implementation, a user may specify a setting level for a given node 102, which may be visually indicated, as shown in FIG. 6 by the shading and bold text used for "HIGH" and "MINIMAL" for node 1 and "DEFAULT" and "NORMAL" for node N. Further, it is to be appreciated that a given setting presented may vary by node and capabilities thereof. For example, a node not capable of supporting Wi-Fi 6 would not include an option for use of a 6 GHz channel.

The user interface 600 may include a surge throughput section 610 that identifies options, if any, for surge throughput modifications with respect to one or more nodes. For at least one implementation, such options may correspond to one or more link characteristics a network resource such as the external link 109. In FIG. 6, non-limiting examples of surge throughput options shown include "LINK CHARACTERISTIC" section 612 and "DURATION" section 614. A surge throughput modification may include a request for a modification of any of one or more link characteristics, such as "THROUGHPUT", "QOS", or "NONE" (that is, no modifications are requested). Other link characteristics may be identified and other user interfaces may be presented to specify a link characteristic modification at a given level of granularity, such as at a given bits per second, with a given latency, or otherwise.

A surge throughput modification may include a request for a given duration, as shown by the DURATION section 614. Non-limiting examples of duration modifications for a given surge request, may include "IMPULSE", which may be selected when a surge modification is to last long enough for a given data communication operation to complete, such as a large file download, "CONTINUOUS", which may be selected when an surge modification is requested for an indefinite time, and "NONE", which may be selected when surge modifications are not to be provided, for example, enhanced link characteristics not being selected for a node 102 associated with a child user. Other duration settings may be identified and other user interfaces may be presented to specify a duration modification at a given level of granularity, such as for a specific time duration, for a time period, or otherwise.

For at least one implementation, a user interface may be provided which enables an administrator or other account holder to specify access to and/or settings adjustable by one or more users of one or more nodes. For example, a parent may allow a child to utilize surge throughput functions a limited number of times, for a limited period, or otherwise.

Figure 7A:
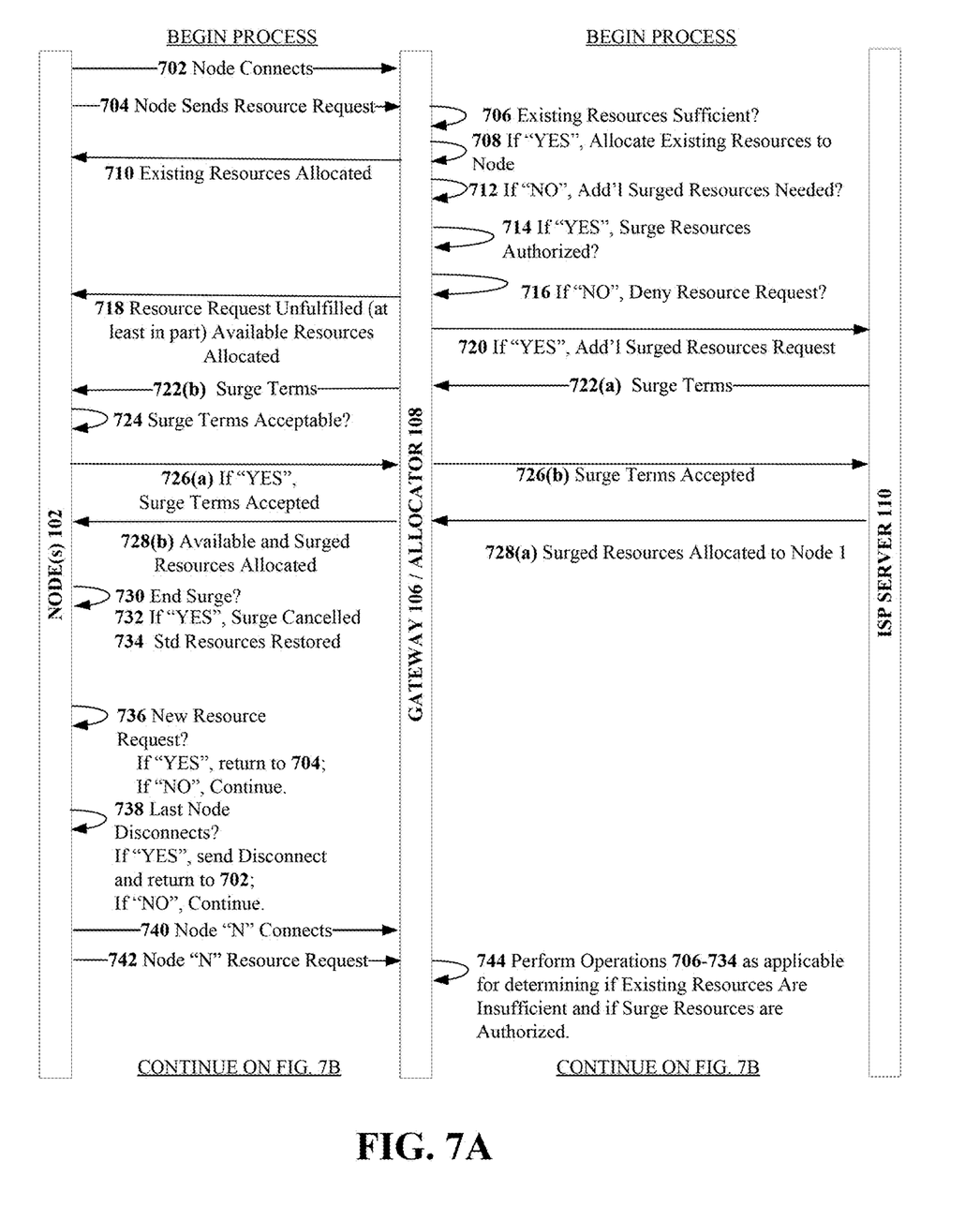
FIGS. 7A-7B is a flow chart representing a process for facilitating gateway prioritization and surge throughput functionalities and in accordance with at least one implementation of the present disclosure.
Figure 7B:
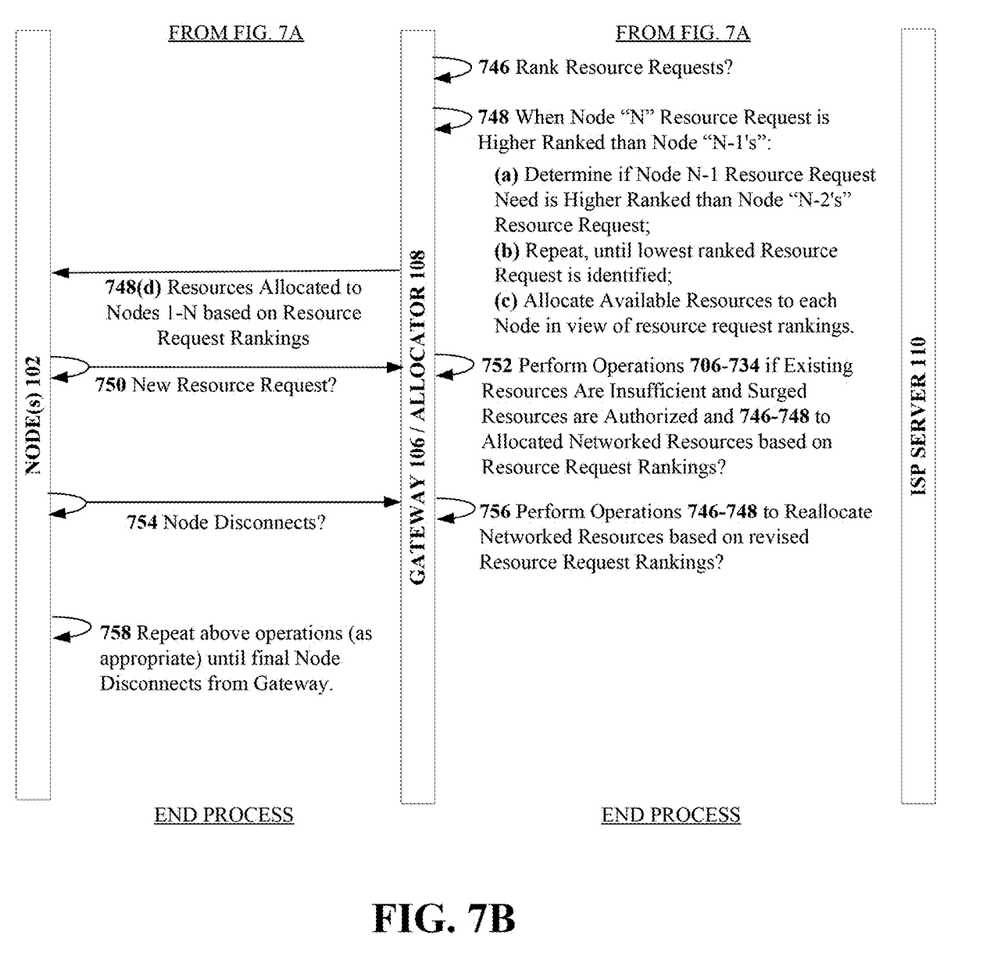

In FIGS. 7A-7B, an implementation of a process for implementing gateway prioritization and surge throughput functionalities is shown and in accordance with at least one implementation of the present disclosure. More specifically, the process is described with respect to the first system 100 implementation where the allocator 108 is instantiated by the gateway 106. It is to be appreciated that such process may be applied to other system implementations including, but not limited to, the second system 300, the third system 400, the fourth system 500, and other system implementations. The process may include the operations shown and other operations (not shown) in any given sequence or otherwise, as logically permissible. Multiple operations may occur in parallel. Various operations may be shown and described herein in sequence for purpose of explanation and are not shown for purposes of claim limitation or otherwise.

As shown, the process may include a connecting of a node with a gateway (Operation 702). The so connected node may be a first node, or any of 1-N nodes that have connected and/or seek to connect with a gateway. The node so connecting may desire to participate on a given LAN by being discoverable by other devices so connected, or otherwise. The connection may include the establishment of a new, not previously occurring communicative coupling of a node with the gateway and/or the resumption or restoration of a previously existing communicative coupling, such as may occur, for example, when a node is "sleeping," inactive, resting, or otherwise.

The node connecting operations may also include an identification, by a node to a gateway, of any node characteristics including any factor data or the like. The node may identify to the gateway, if not previously so identified, one or more node factors, link characteristics supported by the node, or otherwise. As discussed above, such factor data may be utilized by an allocator executed by a gateway (and/or another system component). Such factor data may be stored by a system component. The node connecting operations may also include an identification, by the gateway and/or allocator, of one or more networked resources then available.

Per Operation 704, the node (herein, a "requesting node") may send a resource request to the gateway which, as described above, has instantiated the allocator. The resource request may identify one or more requirements of a given use (or any use) of one or more networked resources including available networked resources and/or networked resources not presently available.

Per Operation 706, the allocator determines if existing/available networked resources satisfy the resource request. Such determination may occur with respect to one, multiple, and/or any of one more networked resources.

Per Operation 708, if the result of the determination per Operation 706 is "Yes", the process may include allocating existing/available networked resources to the resource request.

Per Operation 710, the node is notified of the existing/available networked resources allocation and the process continues at Operation 736.

Per Operation 712, when the result of the determination per Operation 706 is "No", the process may include Operations 714-734.

Per Operation 714, the allocator determines whether the node, that has submitted the resource request for additional networked resources, is authorized for surge throughput functionalities which result in the providing of one or more "surged resources". Different users of requesting nodes may have different levels of authorizations, if any. It is to be appreciated that additional networked resources and/or link characteristics that are not available and may be available pursuant to a surge throughput functionality may include any networked resource and capabilities thereof. For example, and not by limitation, surged resources may include additional bandwidth for an external link, additional processing threads by an ISP server, less latency, a higher QoS, additional channels provided by a gateway, use of a conditional access network server physically closer to the node, or otherwise. Such surged resources may be constrained by contract, technology settings (such as permitted uses being less than any possible use of a given networked resource), or otherwise.

Per Operation 716, when the result of the determination per Operation 714 is "No" and surged resources are not authorized, the process may include the allocator denying the resource request and fulfilling the resource request, as possible, using available (if any) networked resources.

Per Operation 718, such denial and allocation of available networked resources is communicated to the requesting node, and the process continues at Operation 736.

Per Operation 720, when the result of the determination per Operation 714 is "Yes" and use of one or more surged resources are authorized, the process may include the allocator instructing the gateway (or other system component) to request, from the appropriate networked resources, the approved surged resources. Such approved surged resources may include use of additional networked resources, modifications to link characteristics of presently available networked resources, or otherwise. The approved surged resources may satisfy one or more portions of the resource request. For example, a resource request requiring an increased in the bandwidth for an external link may be satisfied by providing the requested bandwidth or by providing an increase in the available bandwidth that is less than the requested bandwidth.

Per Operation 722(a), the process may include the networked resource responding to a surge request, such as an ISP server in the example of an increase in bandwidth for the external link, providing one or more surge terms to the allocator and to the requesting node, per Operation 722(b). Surge terms may be set in advance or specified on an ad hoc basis. Any factor may be used by a networked resource is setting one or more surge terms. For example, a request during the Super Bowl for increased bandwidth on the external link and/or on an Internet link may have different terms than a request for a bandwidth increase at other times.

Per Operation 724, the process may include the requesting node determining whether the surge terms are acceptable. While not shown in FIG. 7, a sub-process may arise where surge terms are negotiated between a requesting node and a networked resource responding to the resource request. Such sub-processes may include any form of commercial transactions, negotiations, or the like. Such sub-processes may be automated, semi-automated, or otherwise. Surge terms may be specified in terms of any negotiable item, including financial instruments including bit coins, swaps/transfers/exchanges of computing and/or telecommunicating resources, for example, the trading of processing time by a requesting node for bit coin harvesting/mining operations, in exchange for an increase in bandwidth for an external link, or otherwise. Surge terms may expressed in terms of any one or more link characteristics such as minutes of speed boosts, byte sizes for data packets, credits for incremental increases, or otherwise.

Per Operation 726a, when the result of Operation 724 are complete, the requesting node may communicate to the allocator the accepted surge terms. Such acceptance may include one or more of the terms provided per Operation 722 or modified terms agreed upon per a sub-process of Operation 724. Per Operation 726b, the accepted surge terms are communicated to the appropriate networked resource(s), such as the ISP server. It is to be appreciated that a change in networked resources and/or link characteristics may effect multiple system components. Accordingly, the communicating of accepted surge terms may be provided to any network resource.

Per Operations 728*a* and 728*b*, the accepted one or more surged resources and/or link characteristics are provided for use by the requesting node. Such providing includes notifying of the allocator and the requesting node of the availability of the surged resources for use. The providing of the surged resources may occur until cancelled or otherwise.

Per Operation 730, the process may include determining, at one or more networked resources, whether a given surge of one or more surged resources is to end. It is to be appreciated that an ending of a surge of a first surged resource may end while a beginning of a surge in a second surged resource begins, and/or while a surge in a third surged resource continues, or otherwise. For example, a resource request for a download of a large file containing complex radiological images may include, first a need for increased bandwidth over an external link to download the files, followed by a need for sharing of data processing resources of another node, such as another computer on a LAN, to process and/or render the downloaded files on a suitable presentation device. Thus, the surged resources may include a first surge by the ISP server providing increased bandwidth on the external link and a second surge by another node providing use of processing resources thereon, while the gateway increases available bandwidth on the internal link to support the first surge and the second surge.

Per Operation 732, when the result of Operation 730 is "Yes", the surge of the surged resources is cancelled. The cancellation may occur with respect to one or more of the surged resources.

Per Operation 734, the process may include a return to pre-surge networked resources being restored and/or continued, as the case may be, for use by the requesting node.

In FIG. 7A, Operations 730, 732 and 734 are shown for purposes of clarity as occurring with requesting to the requesting node may occur with respect to any networked resource.

Per Operation 736, the process may include determining whether an existing node has a new resource request. If so, the process may return to Operation 706 and otherwise continues with Operation 738.

Per Operation 738, the process may include determining whether a last existing node disconnects from the gateway. If so, the process may return to Operation 702 and await connecting of a node to the gateway. Otherwise, the process may continue.

Per Operation 740, the process may proceed with another "N" node connects to the gateway and/or, per Operation 742, a node "N" resource request being communicated to the allocator. As used herein, node "N" refers to any node connected to the gateway.

Per Operation 744, when a new resource request is received by the allocator, Operations 706-734 may be performed to determine if existing networked resources are available and whether surged resources are authorized.

As shown in FIG. 7B, per Operation 746, the process may include determining whether to rank order two or more resource request provided to the allocator at a given time. If so, the allocator ranks the resource request requests. As discussed above, in ranking the resource request, the allocator may consider factor data, link data, need data, and other data. The allocator may be configured to provide a user interface, such as the user interface shown in FIG. 6, to facilitate ranking of resource request requests based on user input, such as the inputs of system administrator or otherwise.

Per Operations 748(*a*)-(*c*), the process may include operations for adjusting allocations of networked resources based upon a given resource request, such as the "Nth" request, having a higher ranking than another resource request, such as the "N-1" request. Such adjusting of networked resources allocations may occur using any iterative, machine logic, artificial intelligence, or other processes. In the implementation of FIGS. 7A-7B, for purposes of illustration, a process for identifying a least ranked resource request is shown. The adjusting of allocations of networked resources may include the allocation of such resources in view of the rankings of the requests. For other implementations, an optimization process may be utilized where allocations of networked resources are optimized across multiple requests. Other approaches may be used for allocation of networked resources. Per Operation 748(*d*), the as allocated networked resources are communicated to the nodes impacted by such allocations, which may include nodes in addition to the then requesting node.

Per Operation 750, the process may include a sending of a new resource request to the allocator.

Per Operation 752, when a new resource request is received by the allocator, Operations 706-734 and/or 746-748 may be performed.

Per Operation 754, when a node disconnects from the gateway, the process may include, per Operation 756, performing Operations 746-748 to reallocate networked resources, as appropriate, and/or, per Operation 758, repeating one or more of the above Operations until a final node disconnects from the gateway.

It is to be appreciated that the operations described above and depicted in FIGS. 7A-7B are illustrative and are not intended herein to occur, for all embodiments of the present disclosure, in the order shown, in sequence, or otherwise. One or more operations may be performed in parallel and operations may be not performed, as provided for any given use of an implementation of the present disclosure.

Although various embodiments have been described above with a certain degree of particularity, or with reference to one or more individual embodiments, those skilled in the art could make numerous alterations to the disclosed embodiments without departing from the spirit or scope hereof. The use of the terms "approximately" or "substantially" means that a value of an element has a parameter that is expected to be close to a stated value or position. As is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "next", "last", "before", "after", and other similar terms are used for description and ease of reference purposes and are not intended to be limiting to any orientation or configuration of any elements or sequences of operations for the various embodiments of the present disclosure. Further, the terms "coupled", "connected" or otherwise are not intended to limit such interactions and communication of signals between two or more devices, systems, components or otherwise to direct interactions; indirect couplings and links may also occur. Further, the terms "and" and "or" are not intended to be used in a limiting or expansive nature and cover any possible range of combinations of elements and operations of an implementation of the present disclosure. Other embodiments are therefore contemplated. It is intended that matter contained in the above description and shown in the accompanying drawings shall be interpreted as illustrative of embodiments and not limiting. Changes in detail or structure may be made without departing from the basic elements of the present disclosure as defined in the following claims.

What is claimed is:

1. A system for gateway prioritization comprising:
a gateway;
a first node;
   wherein the first node is characterized by a first node technical factor;
      wherein the first node technical factor is a first node bandwidth capability;
a second node;
   wherein the second node is characterized by a second node technical factor;
   wherein the second node technical factor is a second node bandwidth capability;
wherein the gateway, the first node, and the second node are communicatively coupled by an internal link;
   wherein the internal link is characterized by a first internal link characteristic;
      wherein the first internal link characteristic is an internal link bandwidth;
wherein the gateway executes one or more non-transient computer instructions to instantiate an allocator; and
wherein the allocator instructs the gateway to allocate the first internal link characteristic to the first node and to the second node based on:
   a first resource request, received from the first node, seeking a first allocation of internal link bandwidth to the first node;
   a second resource request, received from the second node, seeking a second allocation of the internal link bandwidth to the second node; and
   a multi-variable ranking of:
      the first resource request in view of the first node bandwidth capability; with
      the second resource request in view of the second node bandwidth capability.

2. The system of claim 1 further comprising:
an Internet Service Provider (ISP) server coupled by an external link to the gateway;
wherein the external link includes an external link bandwidth characteristic;
wherein the first resource request identifies the external link bandwidth characteristic; and
wherein the allocator allocates the external link bandwidth characteristic in view of the multi-variable ranking system further ranking the first node bandwidth capability in view of the external link bandwidth characteristic versus the second node bandwidth capability in view of the external link bandwidth characteristic.

3. The system of claim 2,
wherein the first resource request includes a third request, received from an external control device coupled to the first node, for a third allocation to the first node that is larger than the first allocation of the internal link bandwidth to the first node; and
wherein the allocator allocates the third allocation of the internal link bandwidth to the first node by reducing an existing allocation of the internal link bandwidth to the second node when the third allocation is less than the first node bandwidth capability.

4. The system of claim 1, wherein the first resource request includes a surge request requesting a modification in an external link bandwidth characteristic.

5. The system of claim 4,
wherein the allocator confirms the first node is authorized to submit the surge request before performing the modification of the external link bandwidth characteristic.

6. The system of claim 5,
wherein the surge request includes a request for an increase of the external link bandwidth characteristic available for use by the first node.

7. The system of claim 6,
wherein the surge request includes a request for a decrease in external link bandwidth characteristic allocated to the second node.

8. The system of claim 1,
wherein a first node non-technical factor is associated with the first node;
wherein a second node non-technical factor is associated with the second node;
wherein the first node non-technical factor identifies an adult user of the first node;
wherein the second node non-technical factor identifies a child user of the second node; and
wherein the multi-variable ranking system further ranks the first node non-technical factor above the second node non-technical factor.

9. The system of claim 8,
wherein the internal link forms a local area network (LAN) between the first node, the second node, and the gateway.

10. The system of claim 1,
wherein a second node factor is associated with the first node;
wherein the second node factor identifies a device type;
wherein the second node factor is second also associated with the second node; and
wherein the first resource request includes a device type supported link characteristic for the internal link; and
wherein the allocator further allocates the internal link bandwidth between the first node and the second node based on an ordering of the second node factor by the multi-variable ranking.

11. The system of claim 10,
wherein a third node factor identifies an application program type;
wherein the third fourth node factor, for the first node, identifies a first application program associated with an employment activity;
wherein the third node factor, for the second node, identifies a second application program associated with a remote schooling activity; and
wherein the allocator further prioritizes allocation of the internal link bandwidth to the first application program over the second application program based on the multi-variable ranking system further ranking the first application program for the first node over the second application program for the second node.

12. The system of claim 1,
wherein, when the first allocation plus the second allocation is equal to or less than a total available internal link bandwidth, the gateway allocates the internal link bandwidth as follows:
   all of the first allocation to the first node; and
   all of the second allocation to the second node.

13. The system of claim 12,
wherein, when the first allocation plus the second allocation is greater than the total available internal link bandwidth, the gateway allocates the internal link bandwidth as follows:

when the first allocation is equal to or less than the first node bandwidth:
   all of the first allocation to the first node, and
   none of the second allocation to the second node; and
when the first allocation is greater to or less than the first node bandwidth capability:
   a portion of the first allocation to the first node that is equivalent to the first node bandwidth, and
   a remainder of the first allocation to the second node.

* * * * *